United States Patent [19]

Nilsson

[11] Patent Number: 4,468,985
[45] Date of Patent: Sep. 4, 1984

[54] PLANETARY GEARING SYSTEM
[75] Inventor: Sven W. Nilsson, Partille, Sweden
[73] Assignee: SKF Nova AB, Goteberg, Sweden
[21] Appl. No.: 381,970
[22] Filed: May 25, 1982

Related U.S. Application Data

[63] Continuation-in-part of Ser. No. 176,263, Aug. 8, 1980, abandoned, which is a continuation of Ser. No. 944,970, Sep. 22, 1978, abandoned.

[30] Foreign Application Priority Data

Nov. 29, 1977 [SE] Sweden .............................. 7713480

[51] Int. Cl.³ .............................................. F16H 1/28
[52] U.S. Cl. ....................................... 74/801; 74/798; 74/788; 74/785
[58] Field of Search ................. 74/409, 785, 788, 798, 74/801, 802

[56] References Cited

U.S. PATENT DOCUMENTS

| | | | |
|---|---|---|---|
| 751,588 | 2/1904 | Westinghouse | 74/801 |
| 1,015,477 | 1/1912 | Conant | 74/801 |
| 1,060,865 | 5/1913 | Sundh | 74/801 |
| 1,820,061 | 8/1931 | Flagg | 74/801 |
| 2,591,967 | 4/1952 | Ridgely et al. | 74/801 |
| 2,932,992 | 4/1960 | Larsh | 74/801 |
| 3,267,771 | 8/1966 | Bugg | 74/798 |
| 3,481,222 | 12/1969 | Baron | 74/802 |
| 3,548,673 | 12/1970 | Suchocki | 74/409 |
| 4,095,488 | 6/1978 | Nilsson | 74/801 |

FOREIGN PATENT DOCUMENTS 1232244 5/1971 United Kingdom .

Primary Examiner—Allan D. Herrmann
Assistant Examiner—Joseph M. Rolnicki
Attorney, Agent, or Firm—Eugene E. Renz, Jr.

[57] ABSTRACT

A planetary gearing system comprising a planet carrier and planet gear wheels and planet friction wheels supported on planet wheel shafts on said planet carrier, said planet gear wheels cooperating with a gear ring encircling them and a sun gear wheel, said planet friction wheel cooperating with a friction ring circumscribing them and with a sun friction wheel, a housing enclosing the planet gearing system, said friction ring or ring gear being radially movable relative to said housing and means for mounting said gear ring and/or friction ring 20 in said housing by means providing an adjustable friction force so that they rotate in the housing when subjected to a torque exceeding a torque determined by said friction force.

3 Claims, 6 Drawing Figures

PLANETARY GEARING SYSTEM

BACKGROUND AND SUMMARY OF THE INVENTION

This application is a continuation in part of application Ser. No. 176,263 filed Aug. 8, 1980, now abandoned which in turn is a continuation of application Ser. No. 944,970 filed Sept. 22, 1978, now abandoned.

The present invention refers to a planetary gearing system, incorporating one input shaft and one output shaft or the like, a first and second planet carrier, planet gear wheeels and planet friction wheels supported on planet wheel shafts between said planet carriers, which planet gear wheels cooperate with a gear ring encircling them and with a sun gear wheel, whereas the planet friction wheels cooperate with a friction ring encircling them and with a sun friction wheel, which parts together form a gearing step.

Epicyclic spur gearings, so called planetary gearings of the above-mentioned type are earlier known in different embodiments with one or more gearing steps. Different types of gearings are required for different demands regarding performance, changing up/changing down, as well as regarding form, quality, low noise, etc. It has hitherto been necessary to design a particular gearing for each requirement, which has meant that the manufacturing series will become small and the manufacturing costs will be comparatively high. The purpose of the present invention is to provide a planetary gearing, which due to a simple arrangement can be assembled from one gearing step only to several gearing steps. As it is thereby possible to use standardized components, it is possible to reduce the number of different gearing types to make possible manufacturing of rather long series, which will result in a reduction of the manufacturing costs. This has been solved thereby that each gearing step is designed to form an integral unit in which the planet wheel carrier by means of fastening members is built together to form a cage structure, and wherein each unit forms a complete planetary gearing module, that several modules are interconnectable in a common housing whereby the input shaft of one of the modules is connectable in power transmitting mode to the output shaft of a second, adjacent module or vice versa.

The invention will hereinafter be further described with reference to the accompanying drawings which show some embodiments of the invention.

Figure 1:
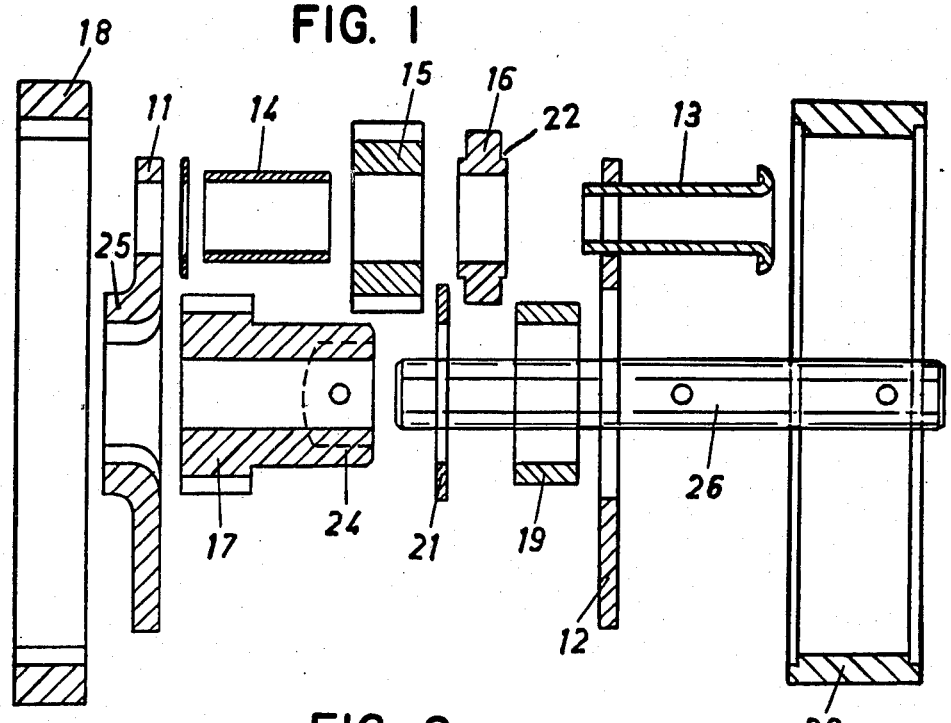
FIG. 1 shows in section the elements forming part of the planetary gearing module according to the invention.
Figure 2:
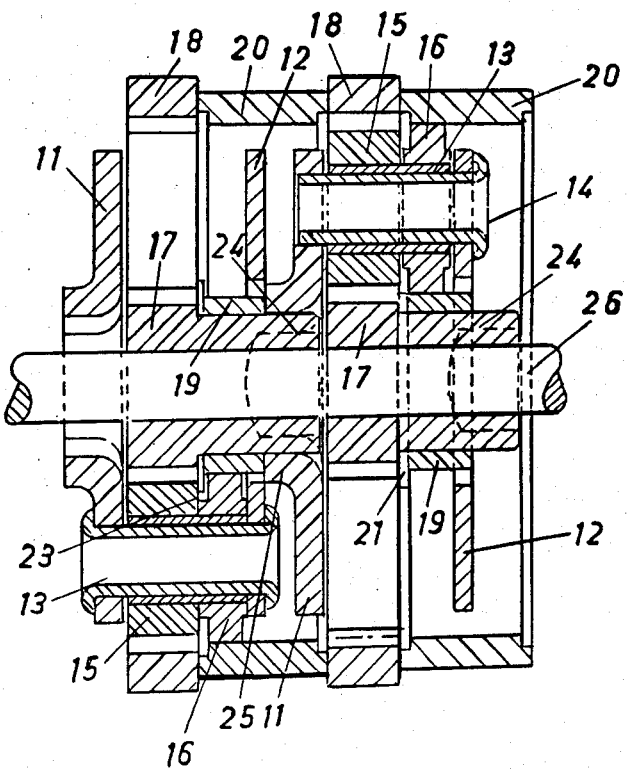
FIG 2 shows a section through two interconnected complete planetary gearing modules according to FIG. 1.

Each planetary gearing module incorporates two planet carriers 11 and 12, which are spaced apart by means of a number of fastening numbers 13, which in the embodiment shown are planet wheel shafts, firmly connected to the planet carriers. On the planet wheel shafts 13 there is rotatably supported a planet gear wheel 15 and a planet friction wheel 16 on a bearing sleeve 14. The planet gear wheels 15 are meshing with a centrally arranged sun gear wheel 17 and a gear ring 18, which encloses the planet gear wheels and the sun gear wheel, whereas the planet friction wheels 16 cooperate with a centrally supported fricton sun wheel 19 and a friction ring 20 enclosing the planet friction wheels and the friction sun wheel. At the sun gear wheel 17 there is provided or firmly connected a shaft journal 24, which forms the input shaft of the planetary gearing and on which the friction sun wheel 19 is rotatably supported. Between the sun gear wheel 17 and the friction sun wheel 19 there is arranged a guiding washer 21 which has a larger external diameter than the diameters of the sun gear wheel and the friction sun wheel. The planet friction wheels 16 are shaped with a step 22, which together with a planet gear wheel 15 arranged on the same planet wheel shaft forms an annular slot 23, into which the guiding washer 21 extends with its peripheral edge portion.

Figure 3:
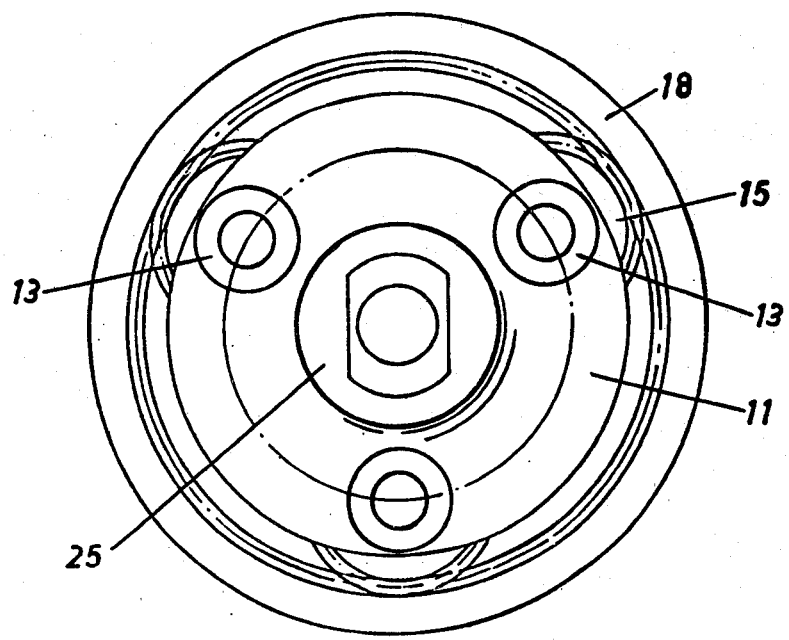
FIG. 3 is an end view of a module as shown from the output shaft side.
Figure 4:
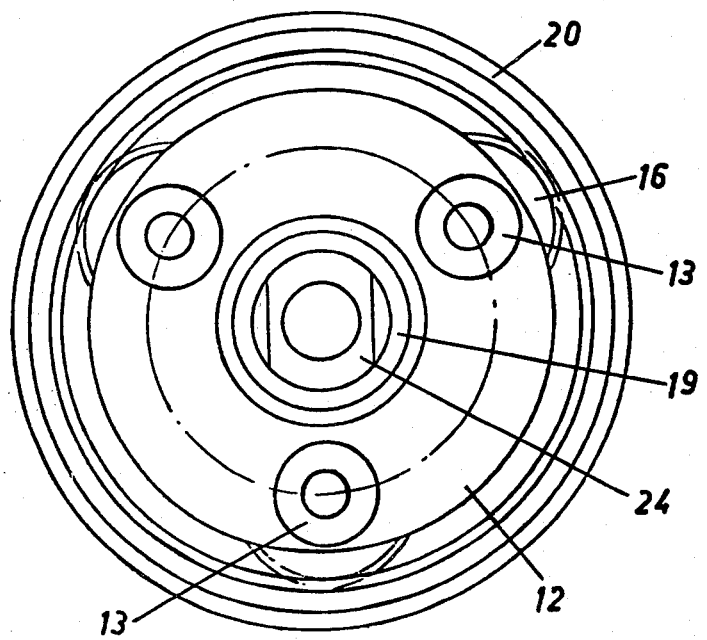
FIG. 4 shows an end view of the module as seen from the input shaft side.

The shaft journal 24 of the sun gear wheel 17 is designed as a hollow shaft which at its free end has a non-circular outer cross-section as can be seen from FIG. 4. The output shaft of the planetary gearing module, which in the embodiment shown is constituted by the planet carrier 11, is designed with an internal non-circular cross-section, in a corresponding manner, see FIG. 3, thus that the two planetary gearing modules can be interconnected by the input shaft 24 of one of the modules introduced into the planet carrier 11 of the other module, which planet carrier acts as a power transmission.

The planet wheel shafts 13 are preferably designed as hollow shafts, whereby it is possible, when transmitting large torques, to connect the output power transmission directly to the apertures in the planet wheel shafts.

The portion of the planet carrier 11 having said internal non-circular cross-section is preferably flanged in order to form a larger engagement surface for the input shaft and this flanged portion forms the output shaft 25 of the module. Due to the fact that the input shaft and the output shaft 24 and 25 respectively are designed as hollow shafts, it is possible to interconnect the input shaft of several planetary gearing modules via a "floating" centre shaft 26.

This embodiment is particularly suited for such cases where it is desired to have the possibility of using the planet friction wheels 16 as supports for the input shaft. When applied to the electromotor, the planet friction wheels thus can substitute the ordinary bearings of the motor armature whereby a double supporting effect is obtained for each module.

Figure 5:
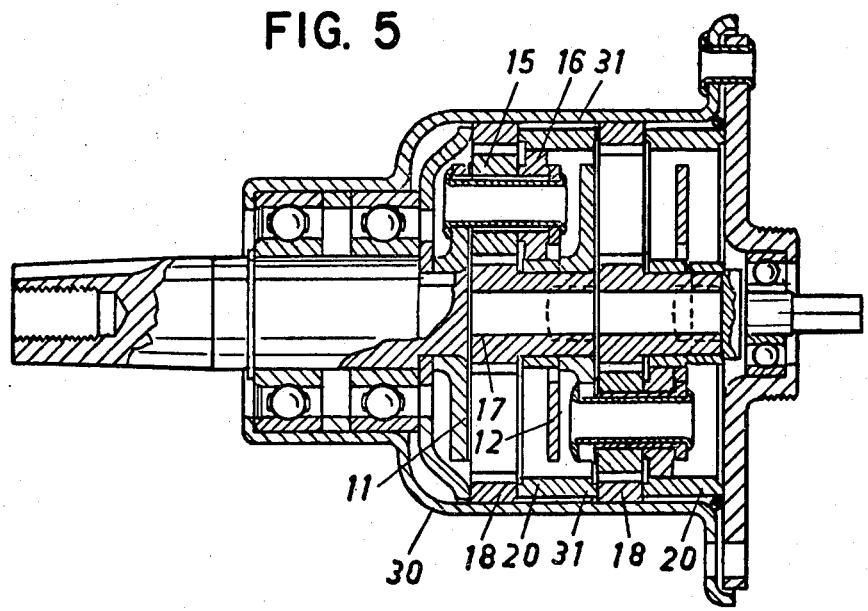
FIG. 5 shows a section through a complete planetary gearing having two steps built into a housing.

In FIG. 5 is shown two planetary gearing modules built into a housing 30 which can consist of a stamped sheet metal cup. In order to obtain a radial adjustment of the friction ring 20, a flexible centering ring 31 is arranged between this and the inner side of the housing 30, whereby pitch faults of the gear wheel will be eliminated as well as possible position faults on the planet shafts, ovality, eccentricity or tolerances. The flexible centering ring 31 can consist of a folded steel circlip or it can be an elastic rubber or plastic ring. Instead of arranging the friction ring 20 to be radially moveable it is also possible to allow the gear ring 18 to make the radial motion whereas the friction ring is fixed against the inner side of the housing 30. In view of the demands put on the planetary gearing one or the other of the above-mentioned embodiments can be used. At high speed gearings working under low loads and having a high noise level and low heat generation it is preferred that the gear ring 18 is radially moveable whereby the centering ring 31 is located between the gear ring and the housing and preferably consists of a rubber or plastic material, by means of which the noise level is reduced. For a high speed gearing working at high loads which generally has a lower noise level but on the other hand has high heat generation the gear ring 18 should be in contact with the housing in order to bring about a good thermal dissipation and a folded steel circlip is preferred as a centering ring 31 as this is less sensitive to heat. In this manner it is easy to adapt the gearing to different demands at the same time as an efficient meshing is obtained.

Figure 6:
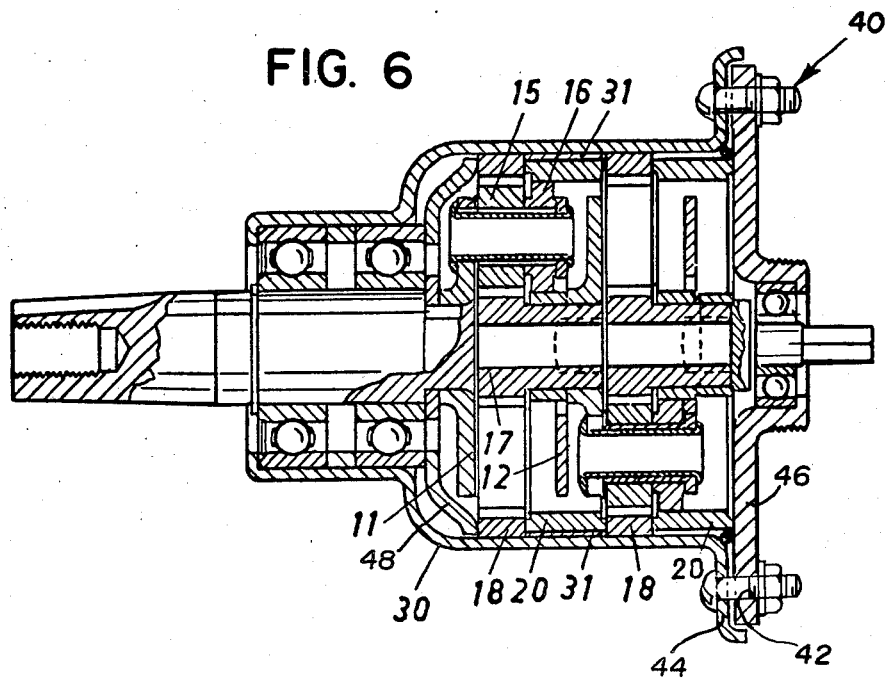
FIG. 6 shows a section through a complete planetary gearing and specifically shows the "overload protection" for the system.

In order not to overload the planetary gearing it can be advantageous to build in an overload protection, which can be obtained with simple aids thereby that the gear ring 18 or the friction ring 20 at an exceeded maximum load will begin to rotate in the housing, the friction force of the gear ring or the fricton ring against the housing thereby being adjustable; e.g., as shown in FIG. 6 by a series of circumferentially spaced nut and bolt fasteners 40 which engage through openings 42 in a circumferentially extending flange 44 of the housing 30 and an end closure plate 46. By this arrangement, the screw means may be adjusted simply by turning the nut 40a and if turned in a direction to tighten the assembly, the gear and friction rings 18 and 20 will be squeezed between the right end closure 46 for the housing and washing 48 extending between the left most gear ring 18 and the right most of the large ball bearings.

The guiding washer 21 between the sun gear wheel 17 and the friction sun wheel 19 has beside its purpose of separating the wheels from each other also the purpose to prevent often inavoidable wobbling effects. By cooperation between the guiding washer 21 and the slot 23 between the planet gear wheels 15 and the planet friction wheels 16 an axial fixing of the sun gear wheel and the sun friction wheels in correct positions is also achieved. The planet fricton wheels 16 are preferably designed as overdimensioned rolling bodies whereby a preloading is obtained inside the friction ring. With appropriate preload level it is also possible to transfer a certain torque, whereby the efficiency of the planetary gearing is increased.

Due to the fact that the planetary gearing modules can be delivered as complete assembled units it is possible to sell and store the modules as standard construction details similar to; e.g., ball bearings and which in the same manner as these can be available in different size series based on one or more parameters such as gear module, outer diameter and maximum torque.

What is claimed is:

1. A planetary gearing system comprising a planet carrier and planet gear wheels and planet friction wheels supported on planet wheel shafts on said planet carrier, said planet gear wheels cooperating with a gear ring encircling them and a sun gear wheel, said planet friction wheel cooperating with a friction ring circumscribing them and with a sun friction wheel, a housing enclosing the planet gearing system, said friction ring and ring gear being disposed in side by side abutting relation in said housing, means (46,48) engageable with said friction ring and ring gear at opposite axial ends which is selectively adjustable axially (40,40a) to providing an adjustable friction force between said ring gear and friction ring so that they rotate in said housing when subjected to a torque exceeding a torque determined by said friction force.

2. A planetary gearing system as claimed in claim 1 wherein said means includes an end closure plate (46) and a washer 48 on opposite ends of said friction ring and ring gear and adjustable fastening means securing said end closure plate (46) to said housing for axiallly adjusting the position of said end closure plate.

3. A device according to claim 1, characterized thereby that a guiding washer (21) is arranged coaxially between the sun gear wheel (17) and the friction sun wheel (19), which guiding washer has a larger diameter than the outer diameter of the sun gear wheel as well as the friction sun wheel and that an annular slot (23), wherein the peripheral edge portion of the guiding washer (21) is adapted to extend, is arranged between the planet gear wheels (15) and the planet friction wheels (16).

* * * * *